Inventor
George W. Batchell
By [signature]
Attorney

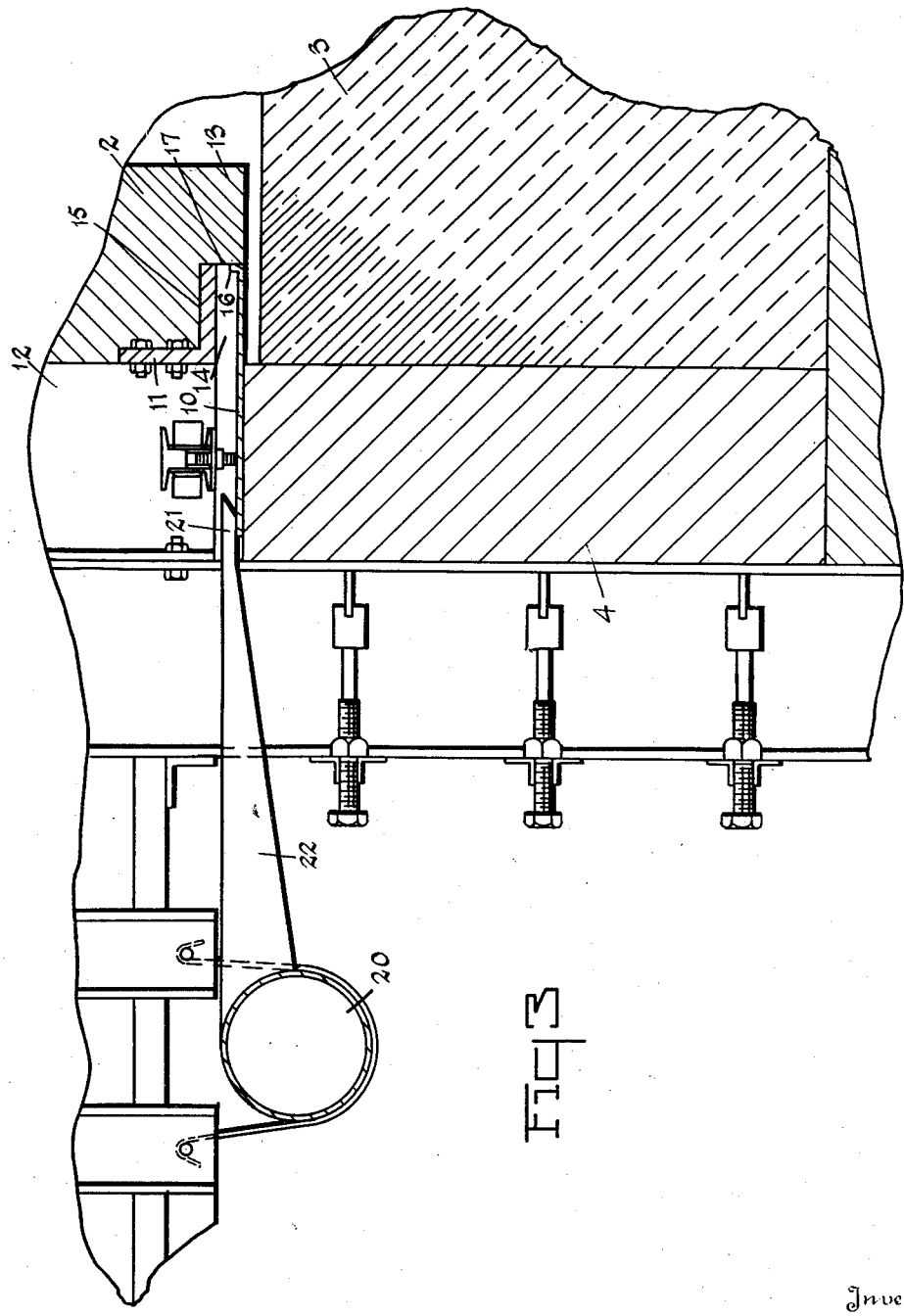

Patented Nov. 4, 1930

1,780,164

UNITED STATES PATENT OFFICE

GEORGE W. BATCHELL, OF TOLEDO, OHIO

GLASS TANK

Application filed June 29, 1929. Serial No. 374,679.

My invention has for its object to provide a glass tank that is so constructed that the cutting of the lower course or courses of the blocks of the side walls of the glass tank will be eliminated or greatly reduced. As is well known, the portions of glass tank walls, located below the level of the glass, are continuously cut away by the hot molten glass. This is due to the chemical action of the fluxes and to the erosion produced by the currents of hot molten glass caused by convection.

The invention also has for its object to produce a cooler area over the surface of the glass or a cooler space in that portion of the volume of glass in proximity to the side walls to reduce the fluidity and prevent contact of the hotter glass with the side walls and also prevent the movement of the glass current along the surface of the side walls. In a preferred form of glass tank constructions, the tanks are so made that the vertical surface of part of the side wall is located well within the marginal areas of the glass surface to produce a pronounced shadow of the heat of the flame by which the glass tank is heated and which is confined in its area by the entire upper part of the wall. The heat produced by the burner of the tank is thus confined to an area of the surface of the glass that is smaller than the entire area of the glass surface. This operates to somewhat cool the glass at the walls. It furthermore prevents cutting away of the side walls by the glass. Also, preferably, such constructions are provided with a means located above the marginal portions of the surface of the glass for slightly cooling the glass. The said means being such, however, as to protect the glass from excess cooling, that is cooling to a degree as to produce any undesirable or undue chemical action of the material in the glass or to vitrify the glass.

The invention may be contained in structures of different forms and, to illustrate a practical application of the invention, I have selected a glass tank that embodies the invention as an example of the various structures that embody the invention and shall describe it hereinafter. The glass tank selected, as an example, is shown in the accompanying drawings and is described hereinafter.

Figure 1:
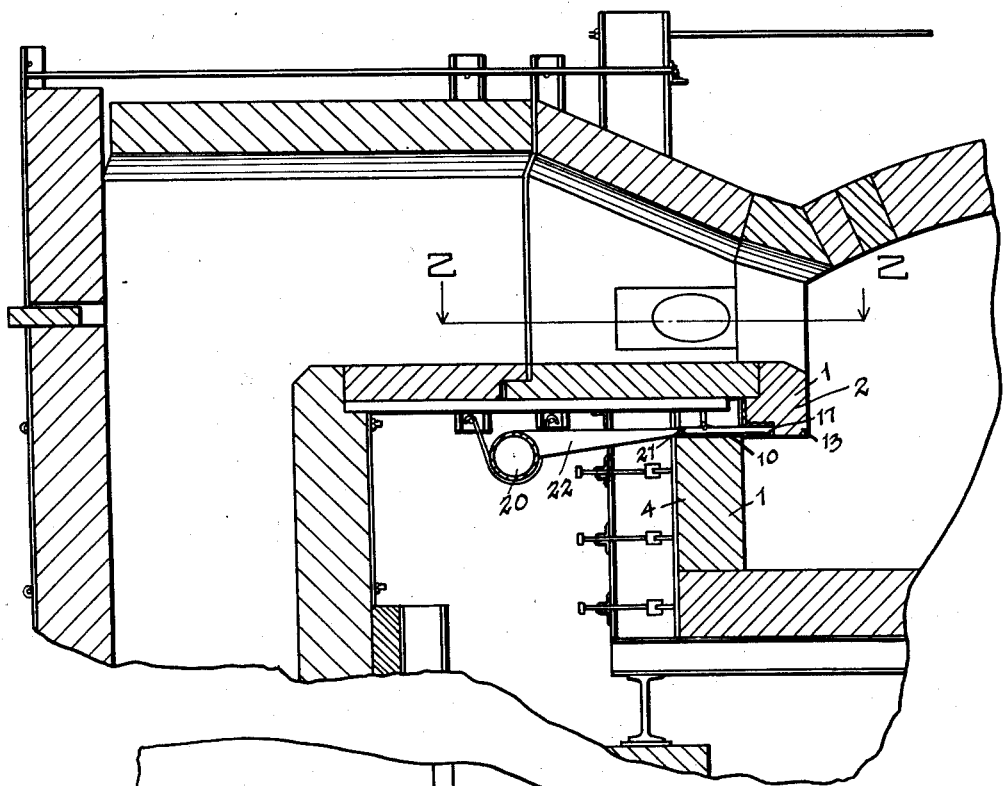
Figure 2:
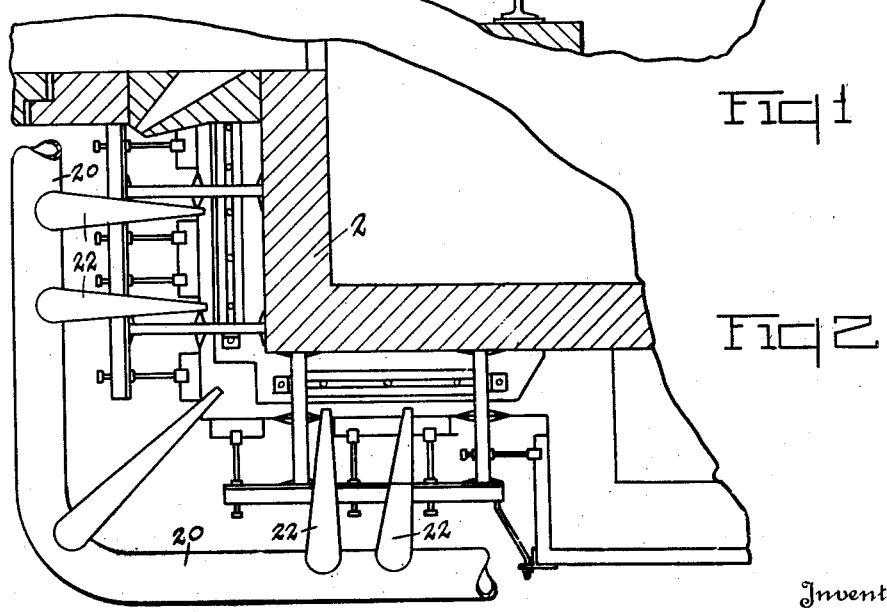

Fig. 1 illustrates a vertical section of a part of the glass taken through one of the burners or gas exhaust ports that leads to the checkerwork of the apparatus. Fig. 2 is a view of a section taken on the plane of the line 2—2 indicated in Fig. 1. Fig. 3 is a larger dimensional view of a vertical section of a part of the tank than that shown in Fig. 1.

The tank is constructed after the manner commonly used in glass tank construction, it being formed of a plurality of large blocks 1 formed of fired clay mixtures that vary according to the purpose for which the blocks of the different courses are to serve. The lower course, or courses, is preferably formed of flux blocks, as they are termed, to produce a high heat resistance where the glass comes in contact with the walls of the tank. Preferably, the entire upper courses 2, namely, those that extend from near the surface of the glass of the tank upwardly, are located well within the area of the surface of the glass 3, the lower course of blocks 4 being so located that their inner faces are farther from the center of the tank than the inner faces of the blocks of the course above the course of blocks 4. Thus portions of the lower horizontal surfaces of the blocks 2 overhang marginal portions of the surface of the glass 3. Preferably, all of the upper courses are so located that their inner faces are nearer the center of the tank than the courses of the blocks that extend slightly above the level of the glass and extend to the bottom of the tank. Thus the upper courses of blocks form a chamber above the surface of the glass that in plan has a smaller area than the chamber formed by the lower courses of blocks in which the glass is located. The upper courses thus confine the heat to an area of the surface of glass that is smaller than the total area of the glass and by reason of the overhanging lower courses of blocks there is produced a shadow or a shield from the heat that materially prevents direct radiation from the flame of the burner and, because of the air space between the lower horizontal surfaces of the overhanging blocks and the surface of the glass, conductivity is materially reduced. Moreover, the portions of the glass that project from beneath the heat chamber of the tank formed by the upper courses of blocks, are subject to cooling because the lower courses of the blocks are located outside of the area or, are more remote from, the heat zone of the tank, than the lower courses of blocks of tanks of the ordinary construction. This subjects the lower courses to the cooling effect of the atmosphere and reduces the temperature of the portions of the glass that protrude or extend beneath the upper courses of blocks that confine the combustion chamber of the tank. Also, the overhanging upper courses of blocks forms a shadow that coacts to produce a lower temperature in the marginal portion of the glass of the tank. Cooling of the marginal regions of the glass operates to reduce the fluidity of the glass in such regions without causing vitrification of the glass, but it maintains reduced mobility with the result that the glass in contact with the lower courses has a lesser effect chemically upon the lower courses of the blocks and also the convection currents produced by the intense heat located over the surface of the central portion of the glass will pass downwardly at points near, or within the inner edges of the marginal portions of the glass and will not move to any material degree to the surfaces of the lower courses of blocks of the tank. This eliminates, or greatly reduces, the erosive effects of the glass and, consequently, greatly reduces the chemical action of the fluxes of the glass on the surface of the blocks.

To further cool the marginal portions of the glass body of the tank, and in cooperative relation to the tank construction described, a plurality of plates of high heat resisting material is so located as to be in contact with the atmosphere exterior to the tank, and in position to overhang marginal portions of the surface of the glass, whereby the upper edge of the glass body will be cooled by radiation and conduction through the plates to a degree that will reduce fluidity without chilling or solidifying of the glass or the production of any vitrification or improper chemical or physical changes that would cause deterioration of the glass. This aids in preventing the hot glass from moving to the wall and causes its descent before it reaches the wall.

Preferably, the upper face of the plates 10 is exposed to the exterior atmosphere while a large portion of the lower face of the plates 10 extends over the body of the glass 3. In order to thus locate the plates 10, the courses of blocks 2 may be supported on suitable angle irons 11 that are connected to the vertical buckstays 12 of the tank. The blocks 2 are preferably formed to provide surfaces that are so related that the rear faces of the blocks 2 may be placed against the buckstays and the brackets 11 will fit the said surfaces. The blocks 2 are also preferably provided with pendent portions 13 having a lower surface that extends parallel and in proximity to the surface of the glass 3 and so as to leave the space 14 between the plates 10 and the lower horizontal surface 15 of the blocks 2. The inner end or side of the space 14 is closed by the depending portions 13 of the blocks 2. The plates 10 have, preferably, upwardly turned flanges 16 that rest against the vertical surface 17 of the blocks 2.

In order that a large cooling area may be formed in the marginal portions of the glass, the lower courses of the blocks are so located that the inner surface of the said blocks are located outside, or substantially in the plane of the outer surface of the upper courses of blocks, that is, the inner faces of the blocks 4 are located substantially in the plane of the outer faces of the blocks 2. Consequently, the blocks 4 are located outside of, or remote from, the heat zone of the tank, which locates a large marginal portion of the glass body also outside of the heat zone or remote from the heat chamber of the tank and yet which, by reason of the mobility of the glass, the marginal portion will be maintained in such a condition that as the glass is used it will not be so affected that it will lose its workability as portions of it work into the central part of the tank if the level of the glass is lowered.

In order to cool the surface of the plates 10 to remove by radiation and conduction the heat of the glass, particularly at the surface and in the corners beneath the overhanging upper courses of blocks, a means is provided for directing a current of air over the surface of the plates 10 and into the recesses or chambers 14. A suitable pipe 20 may be connected to a blower or other source of supply of air under pressure, and the pipe 20 may be connected to a plurality of nozzles 21 that are suitably distributed over the upper surface of the plates 10 to cause the distribution of the air over, preferably, the entire area of the plates and into the recesses or spaces 14. This materially reduces the temperature of the plates 10, particularly those portions of the plates 10 that protrude over and in proximity to the surface of the glass 3, without causing undue chilling of the glass that would be caused by movement of the air current directly against the surface of the glass. The pipe 20 is suitably located with reference to the tank to enable proper manipulation of the glass. The nozzles 21 are connected at suitable points along the pipe 20 by means of the pipes 22.

I claim:

1. In a glass tank formed of blocks, a metal plate protruding over and located in proximity to the surface of the glass, and means for protecting the upper surface of the plate from the heat of the furnace.

2. In a glass tank formed of blocks, the side wall having a block, the inside surface of the said block located farther from the center of the tank than the contiguous block located above the surface of the molten glass, a metal plate protruding over the surface of the glass to a point beneath the said second named block.

3. In a glass tank formed of blocks, the side walls having a course of blocks having inside faces located farther from the center of the tank than the faces of the courses of blocks located above the surface of the glass, a plurality of plates located above the first named blocks and protruding over the surface of the glass and located beneath the second named blocks.

4. In a glass tank formed of blocks, a plurality of plates located above the blocks in contact with the glass and protruding over the surface of the glass, and a means for directing a cooling element over the said plates.

5. In a glass tank formed of blocks, the side wall of the tank having a block, the inside face of the said block located substantially in the plane of the outside face of the block above it, and a metal plate protruding over the surface of the glass and located contiguous to the upper edge of the first named block and the lower edge of the second named block.

6. In a glass tank formed of blocks, the side walls having courses of blocks located farther from the center of the tank than the courses above it a distance substantially equal to the thickness of the said upper courses, the said upper courses located in proximity to and above the surface of the glass, a plurality of plates of metal located contiguous to the upper edges of the first named courses of blocks and the lower edges of the last named courses of blocks.

7. In a glass tank formed of blocks, the side walls having courses of blocks located farther from the center of the tank than the courses above it a distance substantially equal to the thickness of the upper courses of blocks, the said upper courses of blocks located in proximity to and above the surface of the glass, a plurality of plates of metal located contiguous to the upper edges of the first named blocks and in spaced relation to parts of the lower sides of the last named blocks, and means for directing a cooling element between the surface of the said plates and the parts of lower sides of the said last named blocks.

In witness whereof I have hereunto signed my name to this specification.

GEORGE W. BATCHELL.